(12) United States Patent
Chou et al.

(10) Patent No.: US 8,906,479 B2
(45) Date of Patent: *Dec. 9, 2014

(54) COMPOSITIONS OF POLYAMIDE AND IONOMER

(75) Inventors: Richard T. Chou, Hockessin, DE (US); Herbert Vernon Bendler, Wilmington, DE (US); Karlheinz Hausmann, Auvernier (CH)

(73) Assignee: E I du Pont de Nemours and Company, Wilmington, DE (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/341,772

(22) Filed: Dec. 30, 2011

(65) Prior Publication Data

US 2013/0172488 A1    Jul. 4, 2013

(51) Int. Cl.
| | |
|---|---|
| *B32B 1/00* | (2006.01) |
| *B32B 27/00* | (2006.01) |
| *C08L 77/00* | (2006.01) |
| *C08L 77/02* | (2006.01) |
| *C08L 77/04* | (2006.01) |
| *C08L 77/06* | (2006.01) |

(52) U.S. Cl.
USPC ........ 428/34.7; 428/35.7; 428/36.8; 428/36.9; 428/36.91; 428/36.92; 428/474.4; 428/475.5; 525/179; 525/183

(58) Field of Classification Search
CPC ...... C08L 2205/02–2205/025; C08L 23/0876; C08L 77/00; C08L 77/02
USPC ............... 525/179, 183; 428/34.7, 35.7, 36.8, 428/36.9, 36.91, 36.92, 474.4, 475.5
See application file for complete search history.

(56) References Cited

U.S. PATENT DOCUMENTS

| | | | |
|---|---|---|---|
| 3,264,272 | A | 8/1966 | Rees |
| 4,056,653 | A | 11/1977 | Gebhard, Jr. et al. |
| 4,130,139 | A | 12/1978 | Haren |
| 4,174,358 | A | 11/1979 | Epstein |
| 4,440,908 | A | 4/1984 | McClain |
| 4,481,239 | A | 11/1984 | Eckner |
| 4,745,143 | A | 5/1988 | Mason et al. |
| 4,801,633 | A | 1/1989 | Mason et al. |
| 5,320,905 | A | 6/1994 | Vaughn et al. |
| 5,344,883 | A | 9/1994 | Loar et al. |
| 5,741,370 | A | 4/1998 | Hanoka |
| 5,849,382 | A | 12/1998 | Schneck |
| 5,866,658 | A | 2/1999 | Talkowski |
| 6,090,454 | A | 7/2000 | Hausmann et al. |
| 6,306,968 | B1 * | 10/2001 | Bellinger et al. ............ 525/179 |
| 6,399,684 | B1 | 6/2002 | Talkowski |
| 6,475,582 | B1 | 11/2002 | Phan et al. |
| 6,680,082 | B2 | 1/2004 | Chou et al. |
| 6,756,443 | B2 | 6/2004 | Feinberg |
| 6,913,043 | B2 | 7/2005 | Jacques et al. |
| 7,144,938 | B1 | 12/2006 | Feinberg et al. |
| 2003/0078348 | A1 | 4/2003 | Rajagopalan et al. |
| 2003/0145896 | A1 | 8/2003 | Green et al. |
| 2003/0149175 | A1 * | 8/2003 | Feinberg .................. 525/70 |
| 2004/0058111 | A1 | 3/2004 | Manas-Zloczower et al. |
| 2004/0096615 | A1 | 5/2004 | Manas-Zloczower et al. |
| 2005/0020762 | A1 | 1/2005 | Chou et al. |
| 2005/0203253 | A1 | 9/2005 | Chou et al. |
| 2006/0142489 | A1 | 6/2006 | Chou et al. |
| 2008/0097047 | A1 | 4/2008 | Gomez |
| 2010/0009776 | A1 | 1/2010 | Okabe et al. |
| 2010/0029819 | A1 | 2/2010 | Palmer et al. |
| 2010/0113670 | A1 | 5/2010 | Audenaert et al. |
| 2011/0052848 | A1 | 3/2011 | Doshi et al. |
| 2013/0167966 | A1 | 7/2013 | Chou et al. |
| 2013/0171394 | A1 | 7/2013 | Chou et al. |

FOREIGN PATENT DOCUMENTS

| | | |
|---|---|---|
| JP | 58-176246 A | 10/1983 |
| JP | 61-40263 B2 | 9/1986 |
| JP | 5-1304 B2 | 1/1993 |
| JP | 07-145271 A | 6/1995 |
| JP | 2003-277604 A | 10/2003 |
| WO | 98/38227 A1 | 9/1998 |
| WO | 00/78409 A1 | 12/2000 |
| WO | 2004/052993 A1 | 6/2004 |
| WO | 2007/041722 A1 | 4/2007 |
| WO | 2007/041723 A1 | 4/2007 |

OTHER PUBLICATIONS

Polymer 41 (2000) 3069-3082 "Reactive compatibilzation of blends containing liquid crystalline polymers" Zhang et al.*
Chou et al, U.S. Appl. No. 12/507,758, Polyamide Composition Containing Ionomer, filed Jul. 22, 2009.
Hausmann et al, U.S. Appl. No. 61/440,559, Polymer Composition Comprising Polyamide and Ionomer, filed Feb. 8, 2011.
M. G. Wyzgoski and G. E. Novak, "Stress Cracking of Nylon Polymers in Aqueous Salt Solutions Part 1, Stress-rupture behaviour," Journal of Material Science, 1987, pp. 1707-1714).
M. G. Wyzgoski and G. E. Novak, "Stress Cracking of Nylon Polymers in Aqueous Salt Solutions Part 2, Nylon Salt interactions," Journal of Material Science, 1987, pp. 1715-1723).
P. Dunn and G. F. Sansom, "The Stress Cracking of Polyamides by Metal Salts. Part 1. Metal Halides," Journal of Applied Polymer Science, 1969, 13, pp. 1641-1655).
Annual Technical Conference—Society of Plastics Engineers (1997), 55th (vol. 3), pp. 2789-2793.
PCT International Search Report and Written Opinion for International Application No. PCT/US2012/071874 dated Apr. 29, 2013.
BASF Ultramid® 8202C PA6 (Dry) Technical Data Sheet.

* cited by examiner

*Primary Examiner* — Ana Woodward

(57) ABSTRACT

Disclosed is a shaped article comprising a composition comprising polyamide and ionomer wherein the ionomer comprises a mixture of Zn and alkali metal (M2) cations wherein the Zn/M2 equivalent ratio is from about 0.6 to about 6. The articles prepared from the compositions with mixed ion ionomers exhibit high stiffness, hardness and toughness, good scratch resistance, desirable low melt viscosity and high processability.

15 Claims, No Drawings

COMPOSITIONS OF POLYAMIDE AND IONOMER

FIELD OF THE INVENTION

The present invention relates to compositions of polyamides and ionomers useful for molded objects or extruded films.

BACKGROUND OF THE INVENTION

Thermoplastic materials are increasingly used in a form of molded parts or extruded films or sheets in either monolayer (single composition) or in multilayer composites for applications such as sporting goods, hand held devices, cosmetic articles, and automotive exterior and interior parts. For those applications, the surface appearance of the articles is often of primary importance. Thus, the articles require high scratch and abrasion resistance for maintaining desirable surface aesthetic appearance. Excellent scratch resistance, however, is one of the properties that may be difficult to attain for a thermoplastic material compared to lacquer systems, which are often crosslinked. Coating over articles such as with a polyurethane coating in a post-molding process has often been necessary to attain high scratch resistance. A thermoplastic material with high scratch resistance may eliminate the need for such expensive coating processes. For many applications, equally important are other properties such as toughness, mechanical properties, and processability. Wide latitude of processability for making articles in varied manufacturing processes is especially desirable, which requires that the thermoplastic material exhibits appropriate melt rheology.

There is also an overall need in molded parts, particularly in automotive applications such as bumpers, fender extensions, hub caps, and other fascia components and molded exterior parts, for products that have high gloss, good weatherability, high impact strength and high temperature properties (e.g., tensile strength and dimensional stability such as sag and creep resistance). It is also desirable to be able to mold in solid and metallic colors and, optionally, to be able to paint the parts. "Solid" colors present a homogenous finish, even at very close inspection. All ingredients, which can be substantial in number, are milled and blended such that, when applied, they appear to have been produced from a single, homogenous ingredient. The solid color does not sparkle or brighten when directly illuminated by a light source, nor does it appear to change significantly when viewed from different angles. "Metallic" colors (including pearlescents) contain discrete flake pigments, which can range from pearl flakes to aluminum flakes or mica flakes. These flakes are large enough to be discretely identifiable within the field of color being observed. The metallic color has a noticeable "sparkle" when the surface is directly illuminated with a light source, plus they appear to change in color as the panel is rotated from a perpendicular angle to an oblique one. This property is called "polychromaticity". This change in color as the viewing angle is rotated is also referred to as "travel" or "flop".

Ionomers are acid copolymers in which a portion of the carboxylic acid groups in the copolymer are neutralized to salts containing metal ions. U.S. Pat. No. 3,264,272 discloses a composition comprising a random copolymer of copolymerized units of an alpha-olefin having from two to ten carbon atoms, an alpha, beta-ethylenically-unsaturated carboxylic acid having from three to eight carbon atoms in which 10 to 90 percent of the acid groups are neutralized with metal ions, and an optional third mono-ethylenically unsaturated comonomer such as methyl methacrylate or ethyl acrylate.

It is known that thermoplastic blends based on ionomers and polyamides have a combination of desirable properties (see U.S. Pat. Nos. 4,174,358, 5,866,658, 6,399,684, 6,756,443 and 7,144,938). For example, U.S. Pat. No. 5,866,658 discloses a blend of an ionomer dispersed in a continuous or co-continuous polyamide phase in the range of 60/40 weight % to 40/60 weight % used for molded parts exhibiting toughness, high gloss, abrasion/scratch resistance, and high temperature properties. U.S. Pat. No. 6,399,684 discloses similar blends also containing phosphorous salts such as a hypophosphite salt.

The ionomers include zinc ionomers or ionomers with mixtures of zinc and magnesium cations, which have a neutralization of 65 to 100 mole percent of the acid groups. A higher degree of neutralization, however, may cause high melt viscosity. To address the high melt viscosity of the blends of nylon and ionomer, one may use nylon of lower molecular weight and/or incorporate melt flow additives. For example, U.S. Pat. No. 6,756,443, "Ionomer/Polyamide Blends with Improved Flow and Impact Properties", discloses an ionomer/polyamide blend with improved flow (e.g., lower melt viscosity) by incorporating a low molecular weight ethylene/acrylic acid copolymer (acid wax). The method adds complexity and also inevitably compromises properties, such as in abrasion and scratch resistance. U.S. Pat. No. 7,144,938 discloses similar blends also containing one or more esters of montanic acid.

U.S. Patent Application Publications 2005/0203253A1, 2005/020762A1, and 2006/0142489A1 disclose polyamides toughened with ionomers of ethylene copolymers containing a monocarboxylic acid and a dicarboxylic acid or derivative thereof. U.S. patent application Ser. No. 12/507,758 discloses a blend comprising a polyamide, an ionomer of an ethylene copolymer containing a monocarboxylic acid and a dicarboxylic acid or derivative thereof, and a sulfonamide. U.S. Patent Application Ser. No. 61/440,559 discloses a blend comprising a polyamide, an ionomer of an ethylene copolymer containing a monocarboxylic acid and a dicarboxylic acid or derivative thereof, and a second ionomer.

U.S. Pat. No. 6,680,082 describes mixed ion ionomers, particularly ionomers with a mixture of zinc and magnesium, calcium, sodium or lithium for metal coating powder applications. U.S. Patent Application Publication 2008/0097047 discloses blends of polyamides with mixed ion ionomers, including zinc and sodium mixtures.

SUMMARY OF THE INVENTION

An object of this invention is to provide articles prepared from a blend composition comprising polyamide and ionomer having high stiffness, hardness and toughness, good scratch resistance, desirable low melt viscosity and high processability.

This invention provides a shaped article, such as a molded or extruded thermoplastic article comprising a polyamide/ionomer blend composition comprising, prepared from, or consisting essentially of (1) a polyamide having a melt viscosity from about 200 Pa·sec to about 4000 Pa·sec, preferably from about 400 Pa·sec to about 3000 Pa·sec, measured at 250° C. and a shear rate of 12 sec$^{-1}$, in an amount in the range of about 35 to about 70 weight % of the combination of (1) and (2); and (2) an ionomer composition in an amount in the range of about 30 to about 65 weight % of the combination of (1) and (2), wherein the ionomer composition comprises at least one neutralized acid copolymer, wherein the acid copolymer comprises copolymerized units of ethylene with (a) copolymerized units of an alpha-beta unsaturated monocarboxylic acid wherein the monocarboxylic acid is methacrylic acid or acrylic acid or a combination thereof;

(b) optionally copolymerized units of an alpha-beta unsaturated dicarboxylic acid derivative selected from maleic anhydride and alkyl monoesters of maleic acid or fumaric acid, in the amount of 0 to about 7 weight % of the copolymer; wherein the combination of (a) and (b) when present is from about 7 to about 21 weight % of the copolymer;

(c) optionally copolymerized units of an alkyl acrylate or alkyl methacrylate comonomer, in the amount of 0 to about 25 weight % of the copolymer; and wherein about 50 mol % to about 95 mole % of the total carboxylic acid groups in the copolymer are neutralized to salts comprising cations of zinc (Zn) and a second metal (M2) selected from Group 1 of the Periodic Table of the Elements (i.e. alkali metal cations), wherein Zn cations comprise about 10 to about 90% mole equivalents and M2 cations comprise about 90 to 10% mole equivalents.

The article has greater scratch resistance measured according to ISO 1518 than a comparison article comprising a comparison blend of the polyamide and an ionomer comprising cations of zinc that does not contain cations of M2.

Preferably Zn cations comprise about 30 to about 70% mole equivalents of the total cations.

The invention also provides a method for preparing a shaped article comprising the steps:

(a) preparing a blend composition of a polyamide and an ionomer as described above in a molten state;

(b) forming the molten blend composition into a desired shape to provide a shaped molten blend composition; and (c) allowing the shaped molten blend composition to cool and solidify.

The blend composition of the polyamide and the ionomer comprising cations of zinc and a second metal (M2) selected from Group 1 of the Periodic Table of the Elements has lower melt viscosity than a comparison blend of the polyamide and an ionomer comprising cations of zinc that does not contain cations of M2.

DETAILED DESCRIPTION

All references disclosed herein are incorporated by reference.

Unless stated otherwise, all percentages, parts and ratios, are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range having a lower limit of 0, such component is an optional component (i.e., it may or may not be present). Such optional components, when present, are included in an amount preferably of at least about 0.1 weight % of the total weight of the composition or polymer.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that may have become recognized in the art as suitable for a similar purpose.

As used herein, the term "copolymer" refers to polymers comprising copolymerized units resulting from copolymerization of two or more comonomers and may be described with reference to its constituent comonomers or to the amounts of its constituent comonomers such as, for example "a copolymer comprising ethylene and 15 weight % of acrylic acid". Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. However, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

"Sheets" and "films" may be used interchangeably to describe articles wherein the compositions are processed into generally planar forms, either monolayer or multilayer. The processing method and/or the thickness may influence whether the term "sheet" or "film" is used herein, but either term can be used to describe such generally planar articles.

Previously, ionomers with potassium or sodium cations were disclosed to be poor choices for blending with polyamides because of excessive water absorption or poor UV stability (see for example U.S. Pat. No. 5,866,658). Zinc ionomers were preferred, or ionomers with mixtures of zinc and magnesium or calcium cations.

We have discovered that a blend of polyamide and a Zn/alkali metal mixed ion ionomer containing a mixture of zinc and alkali metal (such as Na) cations exhibits excellent scratch resistance exceeding those reported for previous polyamide/ionomer blend products where only zinc or only sodium is used as the ionomer cation. Also it is a surprise that a blend of a Zn/alkali metal mixed ionomer and a polyamide has a lower melt viscosity than a counterpart blend using a Zn-only ionomer. The blend of Zn/alkali metal mixed ionomer and polyamide still retains excellent high temperature properties, high gloss, and toughness. As a consequence, the selection of polyamides need not be confined to lower molecular weight grades. A blend of higher molecular weight polyamide and Zn/alkali metal ionomer is preferred for making extruded articles, such as film, sheet and molded objects. Thus, this technology provides a material with high scratch resistance, a broad window of processability, and latitude of choosing components for tailoring performance.

We have discovered that mixed ion ionomer resins blended with polyamides have the traditional benefits of neutralized ethylene acid copolymers which are neutralized with a single metal, but do not have the associated disadvantages such as water sensitivity and permeability.

The blend provides excellent appearance, high hardness, and weatherability and longevity with proper UV stabilization. The nylon and ionomer components in the blend would allow for development of an FDA-approved film or molded article.

The blend may comprise, consist essentially of, consist of, or be produced from, a polyamide in an amount from a lower limit of about 35, about 45 or about 50 weight % to an upper limit of about 65 or about 70 weight % and a mixed ion ionomer in an amount from a lower limit of about 30 or about 35 weight % to an upper limit of about 50, about 55 or about 65 weight %, of, all based on the weight of the combination of polyamide and ionomer.

Polyamides (abbreviated herein as PA), also referred to as nylons, are condensation products of one or more dicarboxylic acids and one or more diamines, and/or one or more aminocarboxylic acids such as 11-aminododecanoic acid, and/or ring-opening polymerization products of one or more cyclic lactams such as caprolactam and laurolactam. Polyamides may be fully aliphatic or semiaromatic.

Polyamides from single reactants such as lactams or amino acids, referred to as AB type polyamides are disclosed in *Nylon Plastics* (edited by Melvin L. Kohan, 1973, John Wiley and Sons, Inc.) and include nylon-6, nylon-11, nylon-12, or combinations of two or more thereof. Polyamides prepared from more than one lactam or amino acid include nylon-6,12.

Other well known polyamides useful in the composition include those prepared from condensation of diamines and diacids, referred to as AABB type polyamides (including nylon-66, nylon-610, nylon-612, nylon-1010, and nylon-1212), as well as from a combination of lactams, diamines and diacids such as nylon-6/66, nylon-6/610, nylon-6/66/610, nylon-66/610, or combinations of two or more thereof.

Fully aliphatic polyamides used in the resin composition are formed from aliphatic and alicyclic monomers such as diamines, dicarboxylic acids, lactams, aminocarboxylic acids, and their reactive equivalents. In this context, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic dicarboxylic acids, such as for example adipic acid (C6), pimelic acid (C7), suberic acid (C8), azelaic acid (C9), decanedioic acid (C10), dodecanedioic acid (C12), tridecanedioic acid (C13), tetradecanedioic acid (C14), and pentadecanedioic acid (C15). Diamines can be chosen among diamines with four or more carbon atoms, including but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Semi-aromatic polyamides include a homopolymer, a copolymer, a terpolymer or more advanced polymers formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids, as disclosed above. Alternatively, an aromatic diamine such as meta-xylylene diamine (MXD) can be used to provide a semi-aromatic polyamide, an example of which is MXD6, a homopolymer comprising MXD and adipic acid.

Preferred polyamides disclosed herein are homopolymers or copolymers wherein the term copolymer refers to polyamides that have two or more amide and/or diamide molecular repeat units. The homopolymers and copolymers are identified by their respective repeat units. For copolymers disclosed herein, the repeat units are listed in decreasing order of mole % repeat units present in the copolymer. The following list exemplifies the abbreviations used to identify monomers and repeat units in the homopolymer and copolymer polyamides:

HMD hexamethylene diamine (or 6 when used in combination with a diacid)
T Terephthalic acid
AA Adipic acid
DMD Decamethylenediamine
6ε-Caprolactam
DDA Decanedioic acid
DDDA Dodecanedioic acid
I Isophthalic acid
MXD meta-xylylene diamine
TMD 1,4-tetramethylene diamine
4T polymer repeat unit formed from TMD and T
6T polymer repeat unit formed from HMD and T
DT polymer repeat unit formed from 2-MPMD and T
MXD6 polymer repeat unit formed from MXD and AA
66 polymer repeat unit formed from HMD and AA
10T polymer repeat unit formed from DMD and T
410 polymer repeat unit formed from TMD and DDA
510 polymer repeat unit formed from 1,5-pentanediamine and DDA
6 polymer repeat unit formed from ε-caprolactam
610 polymer repeat unit formed from HMD and DDA
612 polymer repeat unit formed from HMD and DDDA
11 polymer repeat unit formed from 11-aminoundecanoic acid
12 polymer repeat unit formed from 12-aminododecanoic acid In the art the term "6" when used alone designates a polymer repeat unit formed from ε-caprolactam. Alternatively "6" when used in combination with a diacid such as T, for instance 6T, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

In various embodiments the polyamide composition comprises one or more polyamides selected from among the following groups (wherein PA is shorthand for polyamide or "nylon-"):

Group I polyamides have a melting point of less than 210° C., and comprise an aliphatic or semiaromatic polyamide such as poly(pentamethylene decanediamide) (PA510), poly(pentamethylene dodecanediamide) (PA512), poly(ε-caprolactam/hexamethylene hexanediamide) (PA6/66), poly(ε-caprolactam/hexamethylene decanediamide) (PA6/610), poly(ε-caprolactam/hexamethylene dodecanediamide) (PA6/612), poly(hexamethylene tridecanediamide) (PA613), poly(hexamethylene pentadecanediamide) (PA615), poly(ε-caprolactam/tetramethylene terephthalamide) (PA6/4T), poly(ε-caprolactam/hexamethylene terephthalamide) (PA6/6T), poly(ε-caprolactam/decamethylene terephthalamide) (PA6/10T), poly(ε-caprolactam/dodecamethylene terephthalamide) (PA6/12T), poly(hexamethylene decanediamide/hexamethylene terephthalamide) (PA610/6T), poly(hexamethylene dodecanediamide/hexamethylene terephthalamide) (PA612/6T), poly(hexamethylene tetradecanediamide/hexamethylene terephthalamide) (PA61416T), poly(ε-caprolactam/hexamethylene isophthalamide/hexamethylene terephthalamide) (PA6/6I/6T), poly(ε-caprolactam/hexamethylene hexanediamide/hexamethylene decanediamide) (PA6/66/

610), poly(ε-caprolactam/hexamethylene hexanediamide/hexamethylene dodecanediamide) (PA6/66/612), poly(ε-caprolactam/hexamethylene hexanediamide/hexamethylene decanediamide/hexamethylene dodecanediamide) (PA6/66/610/612), poly(2-methylpentamethylene hexanediamide/hexamethylene hexanediamide/hexamethylene terephthalamide) (PAD6/66/6T), poly(2-methylpentamethylene hexanediamide/hexamethylene hexanediamide) (PAD6/66), poly(decamethylene decanediamide) (PA1010), poly(decamethylene dodecanediamide) (PA1012), poly(decamethylene decanediamide/decamethylene terephthalamide) (PA1010/10T) poly(decamethylene decanediamide/dodecamethylene decanediamide/decamethylene terephthalamide/dodecamethylene terephthalamide (PA1010/1210/10T/12T), poly(11-aminoundecanamide) (PA11), poly(11-aminoundecanamide/tetramethylene terephthalamide) (PA11/4T), poly(11-aminoundecanamide/hexamethylene terephthalamide) (PA11/6T), poly(11-aminoundecanamide/decamethylene terephthalamide) (PA11/10T), poly(11-aminoundecanamide/dodecamethylene terephthalamide) (PA11/12T), poly(12-aminododecanamide) (PA12), poly(12-aminododecanamide/tetramethylene terephthalamide) (PA12/4T), poly(12-aminododecanamide/hexamethylene terephthalamide) (PA12/6T), poly(12-aminododecanamide/decamethylene terephthalamide) (PA12/10T) poly(dodecamethylene dodecanediamide) (PA1212), and poly(dodecamethylene dodecanediamide/dodecamethylene dodecanediamide/dodecamethylene terephthalamide)) (PA1212/12T).

Group I polyamides may have semiaromatic repeat units to the extent that the melting point is less than 210° C. and generally the semiaromatic polyamides of the group have less than 40 mole percent of semiaromatic repeat units. Semiaromatic repeat units are defined as those derived from monomers selected from one or more of the group consisting of aromatic dicarboxylic acids having 8 to 20 carbon atoms and aliphatic diamines having 4 to 20 carbon atoms.

Notable Group I polyamides include PA6/66, PA6/610, PA6/66/610, PA6/6T, PA1010, PA11 and PA12.

Group II polyamides have a melting point of at least 210° C., comprising an aliphatic polyamide such as poly(tetramethylene hexanediamide) (PA46), poly(ε-caprolactam) (PA6), poly(hexamethylene hexanediamide/(ε-caprolactam) (PA66/6), poly(hexamethylene hexanediamide) (PA66), poly(hexamethylene hexanediamide/hexamethylene decanediamide) (PA66/610), poly(hexamethylene hexanediamide/hexamethylene dodecanediamide) (PA66/612), poly(hexamethylene hexanediamide/decamethylene decanediamide) (PA66/1010), poly(hexamethylene decanediamide) (PA610), poly(hexamethylene dodecanediamide) (PA612), poly(hexamethylene tetradecanediamide) (PA614), poly(hexamethylene hexadecanediamide) (PA616), and poly(tetramethylene hexanediamide/2-methylpentamethylene hexanediamide) (PA46/D6).

Notable Group II polyamides include PA6, PA66, PA610 and PA612. The RV of PA 6 is commonly measured according to ISO Test Method 307 using a solution of 1% of polymer in 96% sulfuric acid. Most common PA 6 grades used for molding and extrusion applications are suitable. For example, both Ultramid B33 (extrusion grade from BASF) with a RV of 3.3 and Ultramid B27 (molding grade from BASF) with a RV of 2.7 are suitable. The RV of PA 66 is commonly measured according to ISO Test Method 307 using a solution of 1% of polymer in 90% formic acid.

Group III polyamides have a melting point of at least 210° C. and comprise
(aa) about 20 to about 35 mole percent semiaromatic repeat units derived from one or more monomers selected from
(i) aromatic dicarboxylic acids having 8 to 20 carbon atoms and aliphatic diamines having 4 to 20 carbon atoms; and
(bb) about 65 to about 80 mole percent aliphatic repeat units derived from one or more monomers selected from
(ii) an aliphatic dicarboxylic acid having 6 to 20 carbon atoms and an aliphatic diamine having 4 to 20 carbon atoms; and
(iii) a lactam and/or aminocarboxylic acid having 4 to 20 carbon atoms.

Group III polyamides include poly(tetramethylene hexanediamide/tetramethylene terephthalamide) (PA46/4T), poly(tetramethylene hexanediamide/hexamethylene terephthalamide) (PA46/6T), poly(tetramethylene hexanediamide/2-methylpentamethylene hexanediamide/decamethylene terephthalamide) PA46/D6/10T), poly(hexamethylene hexanediamide/hexamethylene terephthalamide) (PA66/6T), poly(hexamethylene hexanediamide/hexamethylene isophthalamide/hexamethylene terephthalamide PA66/6I/6T, and poly(hexamethylene hexanediamide/2-methylpentamethylene hexanediamide/hexamethylene terephthalamide (PA66/D6/6T). A preferred Group III polyamide is PA 66/6T.

Group IV polyamides have a melting point of greater than 230° C. and comprise
(cc) about 50 to about 95 mole percent semiaromatic repeat units derived from one or more monomers selected from
(i) aromatic dicarboxylic acids having 8 to 20 carbon atoms and aliphatic diamines having 4 to 20 carbon atoms; and
(dd) about 5 to about 50 mole percent aliphatic repeat units derived from one or more monomers selected from
(ii) an aliphatic dicarboxylic acid having 6 to 20 carbon atoms and said aliphatic diamine having 4 to 20 carbon atoms; and
(iii) a lactam and/or aminocarboxylic acid having 4 to 20 carbon atoms.

Group IV polyamides include poly(tetramethylene terephthalamide/hexamethylene hexanediamide) (PA4T/66), poly(tetramethylene terephthalamide/ε-caprolactam) (PA4T/6), poly(tetramethylene terephthalamide/hexamethylene dodecanediamide) (PA4T/612), poly(tetramethylene terephthalamide/2-methylpentamethylene hexanediamide/hexamethylene hexanediamide) (PA4T/D6/66), poly(hexaamethylene terephthalamide/2-methylpentamethylene terephthalamide/hexamethylene hexanediamide) (PA6T/DT/66), poly(hexamethylene terephthalamide/hexamethylene hexanediamide) (PA6T/66), poly(hexamethylene terephthalamide/hexamethylene decanediamide) (PA6T/610), poly(hexamethylene terephthalamide/hexamethylene tetradecanediamide) (PA6T/614), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(nonamethylene terephthalamide/12-aminododecanamide) (PA9T/12), poly(decamethylene terephthalamide/11-aminoundecanamide) (PA 10T/11), poly(decamethylene terephthalamide/12-aminododecanamide) (PA10T/12) poly(decamethylene terephthalamide/decamethylene decanediamide) (PA10T/1010), poly(decamethylene terephthalamide/decamethylene dodecanediamide) (PA10T/1012), poly(decamethylene terephthalamide/tetramethylene hexanediamide) (PA10T/46), poly(decamethylene terephthalamide/ε-caprolactam) (PA10T/6), poly(decamethylene terephthalamide/hexamethylene hexanediamide) (PA10T/66), poly(dodecamethylene terephthalamide/dodecamethylene dodecanediamide) (PA12T/1212), poly(dodecamethylene terephthalamide/ε-caprolactam) (PA12T/6), and poly(dodecamethylene terephthalamide/hexamethylene hexanediamide) (PA12T/66). A preferred Group IV polyamide is PA6T/66.

Group V polyamides have a melting point of at least 260° C. and comprise (ee) greater than 95 mole percent semiaromatic repeat units derived from one or more monomers selected from (i) aromatic dicarboxylic acids having 8 to 20 carbon atoms and aliphatic diamines having 4 to 20 carbon atoms; and (ff) less than 5 mole percent aliphatic repeat units derived from one or more monomers selected from (ii) an aliphatic dicarboxylic acid having 6 to 20 carbon atoms and said aliphatic diamine having 4 to 20 carbon atoms; and (iii) a lactam and/or aminocarboxylic acid having 4 to 20 carbon atoms.

Group V polyamides include poly(tetramethylene terephthalamide/2-methylpentamethylene terephthalamide) (PA4T/DT), poly(tetramethylene terephthalamide/hexamethylene terephthalamide) (PA4T/6T), poly(tetramethylene terephthalamide/decamethylene terephthalamide) (PA4T/10T), poly(tetramethylene terephthalamide/dodecamethylene terephthalamide) (PA4T/12T), poly(tetramethylene terephthalamide/2-methylpentamethylene terephthalamide/hexamethylene terephthalamide) (PA4T/DT/6T), poly(tetramethylene terephthalamide/hexamethylene terephthalamide/2-methylpentamethylene terephthalamide) (PA4T/6T/DT), poly(hexamethylene terephthalamide/2-methylpentamethylene terephthalamide) (PA6T/DT), poly(hexamethylene hexanediamide/hexamethylene isophthalamide) (PA 6T/6I), poly(hexamethylene terephthalamide/decamethylene terephthalamide) PA6T/10T, poly(hexamethylene terephthalamide/dodecamethylene terephthalamide) (PA6T/12T), poly(hexamethylene terephthalamide/2-methylpentamethylene terephthalamide/poly(decamethylene terephthalamide) (PA6T/DT/10T), poly(hexamethylene terephthalamide/decamethylene terephthalamide/dodecamethylene terephthalamide) (PA6T/10T/12T), poly(decamethylene terephthalamide) (PA10T), poly(decamethylene terephthalamide/tetramethylene terephthalamide) (PA10T/4T), poly(decamethylene terephthalamide/2-methylpentamethylene terephthalamide) (PA10T/DT), poly(decamethylene terephthalamide/dodecamethylene terephthalamide) (PA10T/12T), poly(decamethylene terephthalamide/2-methylpentamethylene terephthalamide/(decamethylene terephthalamide) (PA10T/DT/12T), poly(dodecamethylene terephthalamide) (PA12T), poly(dodecamethylene terephthalamide)/tetramethylene terephthalamide) (PA12T/4T), poly(dodecamethylene terephthalamide)/hexamethylene terephthalamide) PA12T/6T, poly(dodecamethylene terephthalamide)/decamethylene terephthalamide) (PA12T/10T), and poly(dodecamethylene terephthalamide)/2-methylpentamethylene terephthalamide) (PA12T/DT). A preferred Group V Polyamide is PA6T/DT.

Group VI polyamides have no melting point and include poly(hexamethylene isophthalamide/hexamethylene terephthalamide) (PA6I/6T) and poly(hexamethylene isophthalamide/hexamethylene terephthalamide/hexamethylene hexanediamide) (PA6I/6T/66).

In various embodiments the polyamide is a Group I polyamide, Group II polyamide, Group III polyamide, Group IV polyamide, Group V polyamide or Group VI polyamide, respectively.

Of note are polyamides with a lower ratio of methylene units to amide groups, especially those with a ratio of five or less methylene units per amide group such as PA6, PA66, PA6/66 and most especially PA6 and PA66. Also of note are polyamides with a ratio of methylene units to amide groups of about 5 to about 9 such as PA6,12, PA610, PA612, PA6/610, and PA 6/66/610 and polyamides with a ratio of methylene units to amide groups of 9 or greater such as PA11 and PA12.

Preferred polyamides include PA6, PA66, PA610, PA612, PA6/66, PA6/610, PA6/66/610, PA6/6T, PA1010, PA11, PA12 and combinations thereof. More preferred polyamides include PA6, PA66, PA610, PA612, PA1010, PA11, PA12 and combinations thereof, with PA6 most preferred.

The polyamides may also be blends of two or more polyamides. Preferred blends include those selected from the group consisting of Group I and Group II polyamides, Group I and Group III polyamides, Group I and Group VI polyamides, Group II and Group III polyamides, Group II and Group IV polyamides, Group II and Group V polyamides, Group II and Group VI polyamides, Group III and Group VI polyamides, and Group IV and Group V polyamides.

A preferred blend includes Group II and V polyamides, and a specific preferred blend includes PA66 and PA6T/DT. Another preferred blend includes Group II and Group III polyamides and a specific preferred blend includes PA6 and PA66/6T.

Polyamides and processes for making them are well known to those skilled in the art, so the disclosure of which is omitted in the interest of brevity.

The polyamide is desirably semicrystalline, with a melting point in the range of about 170° C. to about 290° C., or from about 170 to about 230° C., as measured according to differential scanning calorimetry (DSC) by ASTM D789. The polyamide desirably has a melt viscosity in the range from about 200 Pa·sec to about 4000 Pa·sec, preferably in the range from 400 to 3000 Pa·sec, measured at 250° C. and a shear rate of 12 sec$^{-1}$.

A capillary viscosity measurement is most suitable to be used for selecting a polyamide with suitable melt viscosity. For example, a low melt viscosity nylon-12 such as Rilsan® AMNO from Arkema may not be suitable for this application, while a higher melt viscosity nylon-12 such as Rilsan® AESNO from Arkema is preferred. However, a combination of both Rilsan® AMNO and Rilsan® AESNO with a melt viscosity profile in the range described above is suitable for this application.

The polyamide may have a relative viscosity (RV) of 2.5 to 4.0, preferably from 2.6 to 3.5. Relative viscosity is related to melt viscosity. Varied methods may be used for measured RV values, and not all commercial polyamides list the RV values. RV is determined by comparing the time required for a specific volume of polymer solution to flow through a capillary tube with the corresponding flow time of the same volume of pure solvent. Different solvents may be used, depending on the polyamide of interest. Common solvents include 96% sulfuric acid and 90% formic acid. For example, the RV of nylon-6 is measured using 1% in 96% sulfuric acid according to ISO Test Method 307. A similar method for determining RV is according to ASTM D789.

Grades of nylon-6 targeted for extrusion (such as Ultramid® B33 from BASF) with RV of around 3.3 are suitable. Molding grades of nylon-6 (such as Ultramid® B27 from BASF) with RV of around 2.7 are also suitable for this application. On the other hand, some fiber grades with lower RV (such as Ultramid® B24 from BASF) with a RV of 2.4 are not be suitable unless blended with higher RV nylon-6.

The ionomer used in the blend comprises an acid copolymer comprising copolymerized units of ethylene and copolymerized units of an α,β-unsaturated monocarboxylic acid such as acrylic acid or methacrylic acid, or combination thereof. The α,β-unsaturated monocarboxylic acid may be present in the acid copolymer in an amount from about 6 to about 21 weight % of the copolymer.

Of note are dipolymers with about 10 to about 21 weight % or about 14 to about 21 weight % of acrylic acid or methacrylic acid.

Optionally (that is, the comonomer may or may not be present in the copolymer) an α,β-unsaturated dicarboxylic acid derivative selected from maleic anhydride and monoesters of maleic acid or fumaric acid may be an additional comonomer present in the copolymer in an amount of 0 to about 7 weight % of the copolymer. When such dicarboxylic acid derivative is copolymerized in the copolymer, it is preferably present in an amount of about 1 to about 7 weight % of the copolymer, such that the combination of monocarboxylic acid and dicarboxylic acid derivative amounts to about 7 to about 21 weight % of the copolymer. Monoesters of maleic acid or fumaric acid include esters derived from alcohols with 1 to 8, preferably 1 to 4, carbon atoms. Such comonomers include methyl hydrogen maleate and preferably ethyl hydrogen maleate.

Another optional comonomer (the comonomer may or may not be present in the copolymer) is one or more alkyl acrylate or alkyl methacrylate having 1 to 12 or 1 to 8 carbons in the alkyl group, preferably 1 to 4 carbons in the alkyl group, such as methyl acrylate, ethyl acrylate and n-butyl acrylate. When present, the alkyl acrylate or alkyl methacrylate can be present in amounts from 1 to about 25 weight % of the copolymer, notably from 10 to 25 weight %. When alkyl acrylate or alkyl methacrylate is present in the copolymer, the monocarboxylic acid may be present in an amount from 6 to 12 weight % of the copolymer.

Examples of copolymers include dipolymers of ethylene and acrylic acid, dipolymers of ethylene and methacrylic acid, terpolymers of ethylene, acrylic acid and maleic anhydride, terpolymers of ethylene, acrylic acid and ethyl hydrogen maleate, terpolymers of ethylene, methacrylic acid and maleic anhydride, terpolymers of ethylene, methacrylic acid and ethyl hydrogen maleate terpolymers of ethylene, methacrylic acid and alkyl acrylates, and terpolymers of ethylene, acrylic acid and alkyl acrylates, or combinations thereof.

Non-limiting, illustrative examples of ethylene acid copolymers useful in ionomers include E/15MAA, E/19MAA, E/15AA, E/19AA, E/15MAA, E/19MAA, E/10MAA/41BA, E/10MAA/9.81BA, E/9MAA/23nBA, (wherein E represents ethylene, MAA represents methacrylic acid, AA represents acrylic acid, iBA represents isobutyl acrylate, nBA represents n-butyl acrylate, and the numbers represents the weight % of comonomers present in the copolymer).

Methods for preparing ionomers from acid copolymers are well known (see for example U.S. Pat. No. 3,264,272). An ionomer is readily prepared by neutralization of an ethylene acid copolymer, such as E/MAA (or E/AA) copolymers with MAA (or AA) in the range of described with a basic compound such as zinc oxide or sodium hydroxide. In the precursor non-neutralized copolymer, the melt index (MI) prior to neutralization ranges from 20 to 1000 g/10 min, preferably 30 to 500 g/10 min, most preferably 60 to 300 g/10 min measured at 190° C. using a 2.16 kg weight according to ASTM D-1238.

Suitable neutralized zinc or alkali metal neutralized ethylene acid copolymers are sold under the trademark SURLYN® brand resins by E.I. DuPont de Nemours and Company (DuPont) of Wilmington, Del. Mixed ion ionomers are not commercially available. As described in greater detail below, a mixed ion ionomer can be prepared by melt blending a zinc-neutralized ionomer with an alkali metal-neutralized ionomer.

In the final blend composition, from about 50 to about 95 mole % of the carboxylic acid functionalities in the ethylene copolymer are neutralized to salts comprising zinc and one or more alkali metal cations. Preferably, the ionomer has a degree of neutralization of about 60 to about 90%.

However, there are few commercial ionomers having such high degree of neutralization. As the neutralization level increases, the melt viscosity increases. At high neutralization levels, the ionomer may have a melt index too low to process easily. In practice, it is difficult to produce neat ionomers with MI less than 0.5. Accordingly, it may be desirable to melt blend an ionomer having lower neutralization and higher melt index with the polyamide and, either concurrently or subsequently, neutralize the ionomer with additional basic compound to the final neutralization level. Ionomers used in the blending desirably have a MI in the range of 0.5 to 20, preferably about 0.5 to 10 g/10 min measured at 190° C. using a 2.16 kg weight. After any additional neutralization is carried out during melt blending, it is not possible to determine the MI range of the ionomer contained in the blend.

Thus for example, to obtain ionomers with high degrees of neutralization, an alternative route is to add ZnO concentrate to a blend of ionomer(s) and polyamide to increase the neutralization. The resulting ionomer will have a degree of neutralization in the range of 50 to 95%, in which a portion of the neutralization has occurred in the melt compounding stage.

The neutralized acid copolymer used in the instant compositions comprises a mixed metal salt of cations of zinc (Zn) and a second metal (M2) that is different from Zn, selected from Group 1 of the Periodic Table of the Elements, wherein Zn cations comprise about 10 to about 90% mole equivalents and M2 cations comprise about 90 to 10% mole equivalents. Preferred are compositions wherein M2 is sodium, lithium or a mixture thereof; more preferably M2 is sodium. Preferably Zn cations comprise about 30 to about 70% mole equivalents of the total cations. Certain mixed ion ionomers are described in greater detail in U.S. Pat. No. 6,680,082.

Alternatively the mixed ion ionomers can be described in terms of the ratio of equivalents from zinc cations to equivalents from M2 cations. For example, a desirable ratio is from about 0.6 to about 6, corresponding to between about 38 to about 86% of the neutralized acid groups being neutralized to salts with zinc cations. Preferably, the equivalent ratio is from about 0.7 to about 3, or from about 41 to about 75% of the neutralized acid groups neutralized to salts with zinc cations.

Mixed metal ionomers provide a combination of better properties to the blends with polyamides than ionomers comprising a single type of cation. For example, a zinc/sodium mixed ion ionomer blended with polyamide may provide lower water sorption, better scratch resistance and better processing capability than those provided by a corresponding ionomer containing only an alkali metal such as sodium. The zinc/sodium mixed ion ionomer may also provide higher hardness and higher mechanical strength than provided by a corresponding ionomer containing only zinc.

The mixed ion ionomer may be melt blended, such as in an extruder, with polyamides described above to provide a blend composition.

Methods for melt blending include the following embodiments:

(1)(i) Providing the polyamide; (ii) providing the acid copolymer and neutralizing a portion of the acid groups of the copolymer with a combination of basic compounds having a combination of Zn and M2 cations to provide a neutralized acid copolymer comprising salts with a combination of Zn and M2 cations; (iii) melt blending the polyamide with the neutralized acid copolymer; and (iv) optionally providing a basic compound having Zn or M2 cations and neutralizing an additional portion of the acid groups of the acid copolymer in (iii).

(2)(i) Providing the polyamide; (ii) providing an acid copolymer wherein a portion of the acid groups are neutralized to salts with Zn cations to provide a Zn ionomer; (iii) providing an acid copolymer wherein a portion of the acid groups are neutralized to salts with M2 cations to provide an M2 ionomer; (iv) melt blending the polyamide with the Zn ionomer and the M2 ionomer; and (v) optionally providing a basic compound having Zn or M2 cations and neutralizing an additional portion of the acid groups of the ionomers in (iv). In this embodiment, the ethylene acid copolymer used as the base polymer in the zinc ionomer may be the same as, or different from, the ethylene acid copolymer used as the base polymer in the M2 ionomer.

(3)(i) Providing the polyamide; (ii) providing an acid copolymer wherein a portion of the acid groups are neutralized to salts with Zn cations to provide a Zn ionomer; (iii) melt blending the polyamide with the Zn ionomer; and (iv) providing a basic compound having M2 cations and neutralizing an additional portion of the acid groups of the ionomers in (iii).

(4)(i) Providing the polyamide; (ii) providing an acid copolymer wherein a portion of the acid groups are neutralized to salts with M2 cations to provide an M2 ionomer; (iii) melt blending the polyamide with the M2 ionomer; and (iv) providing a basic compound having Zn cations and neutralizing an additional portion of the acid groups of the ionomer in (iii).

The polyamide/ionomer blend may further contain additional additives. The composition or blend can comprise 0.0001 to about 5, 10, 20, or 30 weight %, based on the weight of the entire composition including the polyamide/mixed ion ionomer blend, of optional additives. Such additives include stabilizers, antioxidants, ultraviolet ray absorbers, hydrolytic stabilizers, anti-static agents, dyes or pigments, fillers, fire-retardants, reinforcing agents such as glass fiber and flakes, processing aids such as lubricants, antiblock agents, release agents, or combinations of two or more thereof. The relative percentages of these additives may be varied depending upon the particular use of the object desired. The additives can be added to the polymer blend in typical melt compounding equipment.

Suitable stabilizers include antioxidants, such as the IRGANOX® family produced by Ciba-Geigy (now a part of BASF), and UV stabilizers such as those sold under the TINUVIN® tradename by Ciba-Geigy or CYASORB® light stabilizer and light absorber produced by Cytec. Preferred antioxidants are based on hindered phenols, and preferred UV stabilizers are based on hindered amine light stabilizers (HALS). Suitable pigments include both inorganic and organic pigment that provides desirable color, such as titanium dioxide for providing white color.

Lubricants of note include salts of fatty acids such as sodium stearate or zinc stearate, which may be added at about 0.1 to 1 weight of the total composition.

The blend may also contain phosphorous salts such as a hypophosphite salt. Suitable phosphorous salts for use in the blends are described in greater detail in U.S. Pat. No. 6,399,684. The salts, including sodium, lithium, or potassium hypophosphite may be added to the blend composition in about 0.1 to about 3 weight % of the composition. Hypophosphite salts may provide improved morphological or physical properties to the blend such as increased Vicat temperature and/or improved tensile properties.

The blend may also contain phosphorous salts such as a hypophosphite salt. Suitable phosphorous salts for use in the blends are described in greater detail in U.S. Pat. No. 6,399,684. The salts, including sodium, lithium, or potassium hypophosphite may be added to the blend composition in about 0.1 to about 3 weight % of the composition. Hypophosphite salts may provide improved morphological or physical properties to the blend such as increased Vicat temperature and/or improved tensile properties.

Of note is a composition as described herein consisting essentially of (1) a polyamide as described above; (2) a mixed-ion ionomer as described above; and (3) hypophosphite salt.

The composition or blend can optionally comprise additional non-ionomer thermoplastic materials blended with the polyamide and ionomer to allow one to more easily modify the properties of the composition by manipulating the amount and type of additional components present in the composition in addition to varying the percentages of the monomers in the ethylene acid copolymer; or to allow for easier, lower cost manufacture of the composition by allowing one to prepare fewer base resins that can be subsequently modified to obtain desired properties, or to substitute a portion of the composition with a less expensive material. To retain the desired benefits, the additional thermoplastic material may be present in the composition in an amount up to about 20% of the total polymeric material, such as from a lower limit of 1 weight % to an upper limit of 5, 10 or 20 weight % of the total polymeric material.

Non-ionomers include copolyetheramides, elastomer polyolefins, styrene diene block copolymers (e.g., styrene-butadiene-styrene (SBS)), thermoplastic elastomers, thermoplastic polyurethanes (e.g., polyurethane), polyetherester, polyamideether, polyether-urea, PEBAX (a family of block copolymers based on polyether-block-amide, commercially supplied by Atochem), styrene(ethylene-butylene)-styrene block copolymers, etc., polyesters, polyolefins (e.g., polyethylene, polypropylene, or ethylene/propylene copolymers), ethylene copolymers (with one or more comonomers including vinyl acetate, (meth)acrylates, (meth)acrylic acid, epoxy-functionalized monomer, CO, etc., functionalized polymers with maleic anhydride, or epoxidization), grafting, elastomers such as EPDM, metallocene catalyzed PE and copolymer, ground up powders of the thermoset elastomers, or combinations of two or more thereof.

Some of thermoplastic materials may be useful as impact modifiers for the polyamide-mixed ionomer blend. Example impact modifiers include ethylene-propylene dipolymers or terpolymers with an additional α-olefin grafted with a carboxylic acid or anhydride, or ethylenepropylene diene mononomer (EPDM) grafted with a carboxylic acid or anhydride. Preferably the anhydride is maleic anhydride. Such impact modifiers are described in greater detail in U.S. Pat. No. 6,420,481. These impact modifiers may be present in up to 20 weight % of the total composition.

Fillers may be present in the compositions described herein. The shape, size, and size distribution of the filler all impact its effectiveness of filler, though, at high levels, the particular characteristics of the filler become less important. Suitable fillers include mineral fillers such as inorganic oxides, carbonates, sulfates or silicates of a metal of Groups IA, IIA, IIIA, IIIB, VIB or VIII of the periodic table of the elements. Preferred fillers are calcium carbonate, barium sulfate and magnesium silicate. Suitable flow additives or flow control agents include acrylate copolymers, fluorocarbons and silicones. Modifiers of note include micronized fluorocarbon, such as tetrafluoroethylene polymers, for providing lubricity and abrasion resistance.

The polymeric blend composition may be mixed with filler using well known melt mixing methods employing extruders or other suitable mixers such as Banbury or Farrel continuous mixers or roll mills.

The amount of filler, if present, can vary widely. Above about 30 weight % of particulate filler, based on the weight of polymeric blend plus filler, properties such as flexibility, ductility, elongation and tensile strength of the filled material drop off rapidly. A small amount of filler (2 weight % and up in some cases, 5 weight % and up in others and 10 weight % and up in still others) may be sufficiently advantageous for some environments or end uses, while in other cases higher levels (up to about 30 weight %) of a particular filler may be desirable.

Dyes and pigments include organic pigments, such as azo, phthalocyan, indanthrene and other dyes, inorganic pigments such as oxide pigments, e.g., titanium oxide, chromomolybdic acid, sulfide selenium compound, ferrocyanide and carbon black pigments; and powders such as aluminum oxides, aluminum hydroxides and calcium carbonate. Among them, pigments are preferred because they can maintain good flowability and color the molded article even when used in a small amount, which enables a subsequent coloring step to be omitted.

These blends have excellent impact toughness, flexibility, cut and abrasion resistance, low temperature performance and long term durability, especially at specific gravities of less than one.

Once the polyamide/mixed ion ionomer blends are prepared as described above, they can be further processed into shaped articles.

In particular, the method described herein further comprises the steps of processing the composition in a molten state into a shaped composition; and allowing the shaped composition to cool to provide a shaped article. In some cases, the composition may be melt mixed and further processed into a finished shaped article, such as a film, sheet, container, or molded part. In other cases, the composition may be processed into intermediate shaped articles (such as pellets, slugs, rods, ropes, sheets and the like) that may be further transformed by one or more additional processes into finished shaped articles. Suitable additional processes include without limitation extrusion, injection molding, compression molding, overmolding, lamination, coextrusion, extrusion coating, and the like.

Shaped articles are those that comprise the polymer composition in any aspect. For example, articles may be films, sheets, laminated films or sheets, containers such as pouches, bags, bottles, jars, tubs, tanks, trays, cups and other shaped articles, including molded parts for automotive or other vehicles, and manufactured goods.

Shaped articles made from the blends described herein can be made by any of several common methods, including compression molding, injection molding, extrusion, blow molding, melt spinning, film forming including cast film or blown film techniques, and thermoforming. Injection molding is especially noted. Examples of shaped articles include sheet, rod stock, film, filaments, fibers, strapping, and tape. Such shaped articles can be post treated by orientation, stretching, coating, annealing, painting, laminating and plating. Because the blends are thermoplastic, articles can be ground and remolded.

The composition may be formed into shapes by, for example, injection molding (i.e. extrusion of the molten composition into molds, followed by cooling, the molds being in a configuration to produce an article comprising the composition in a desired shape). Sheets or films of the composition may be produced by extrusion through a slot die or annular die and processing the composition by, for example, cast sheet or film extrusion, blown film extrusion, extrusion coating or lamination techniques well know in the polymer processing art.

The polyamide mixed ion ionomer compositions may also be used to form multilayer structures in which at least one layer comprises the polyamide mixed ion ionomer composition.

Other layers of the multilayer structures may include polymeric materials including thermoplastic compositions other than the polyamide mixed ion ionomer composition (including those listed above), and thermoset compositions. The polyamide mixed ion ionomer composition may be applied as a surface coating to various substrates. Substrates may be independently selected from the group consisting of thermoplastic film and sheet, cellular foams, woven, knitted and non-woven fabrics, paper, pulp and paperboard products, wood and wood products, metal, glass, stone, ceramic, leather and leather-like products, thermoplastic resins, and thermoset resins. The polyamide mixed ion ionomer composition may also be a substrate to which other materials are adhered.

The polyamide mixed ion ionomer composition is particularly useful for preparing articles using processes where higher melt flow is desirable, such as injection molding or thin-gauge coating applications. The benefits of using a polyamide mixed ion ionomer composition in these processes include faster molding cycles, better gauge control, the ability to use a higher number of mold cavities to enhance productivity, more intricate and complex mold design, and lower processing temperature to save energy and costs.

In injection molding, the molten composition is forced into the mold tooling of an injection-molding machine. The mold tooling when closed defines a cavity in which the interior walls of the mold tooling define the shape of the final molded piece. A sprue through which the injection molding material is injected is also present in the mold tooling. When the heated composition is injected under pressure by the injection-molding machine, the molding material flows in through the sprue and fills the cavity. The shaped composition is then allowed to cool. Upon completion of the molding process, the mold tooling is opened and the finished shaped article is ejected.

Molded parts of the blend made using standard injection molding techniques may exhibit high gloss and improved mar resistance without the need of light graining. Without light graining, these molded parts exhibiting DOI's of at least 80 and as high as 90 to 95. Solid and metallic colors can be incorporated and parts can be painted. Since the blends allow for faster processing than resins used in the prior art, molded parts can be more readily made. The high temperature properties of the blend are sufficient to permit OEM painting of molded parts without the need for special jigs or hangers to maintain part shape during the bake step.

The molded parts of polyamide/mixed ion ionomer blends with the addition of standard UV stabilizers for both ionomer and polyamide exhibit good weatherability, particularly stability when exposed to ultraviolet light for extended periods of time. These molded parts exhibit the low color shift, measured using, for example, the CIE 1976 (CIE LAB) color scale, needed for molded parts used in exterior applications. They may exhibit ΔE color shift values of less than about 3 (a level considered as suitable for exterior automotive applications) when exposed to 2500 kilojoules/square meter in a Xenon-arc weatherometer (SAE J1960). Improved automobile fascia having DOI of at least 80 and superior mar resistance can be made from such blends.

A multilayer structure such as a film may be made from a layer comprising the polyamide/mixed ion ionomer composition and at least one other layer comprising a composition other than the polyimide/mixed ion ionomer composition. The layers may be coextruded or they may be formed independently and then adhesively attached to one another to form an article. For example, additional layers may comprise or be produced from thermoplastic resins, to which the layer made from the composition is adhered, to provide structure layers, to provide protection or improve the appearance of the article. Examples include multilayer films comprising ionomers or non-ionomers disclosed above as at least one additional layer.

Molten extruded polymers can be converted into a film using any techniques known to one skilled in the art. For example, a film can also be made by coextrusion followed by lamination onto one or more other layers. Other converting techniques are, for example, blown film extrusion, cast film extrusion, cast sheet extrusion and extrusion coating.

A multilayer film may be prepared by coextrusion. For example, granulates of the compositions or components thereof are melted in extruders to produce molten polymeric resins, which are passed through a die or set of dies to form layers of molten polymers that are processed as a laminar flow. The molten polymers are cooled to form a layered structure.

A film can be further oriented beyond the immediate quenching or casting of the film. The process comprises the steps of (co)extruding a laminar flow of molten polymers, quenching the (co)extrudate and orienting the quenched (co) extrudate in at least one direction. The film may be uniaxially oriented, or it can be biaxially oriented by drawing in two mutually perpendicular directions in the plane of the film to achieve a satisfactory combination of mechanical and physical properties.

Orientation and stretching are well known to one skilled in the art and the description of which is omitted herein for the interest of brevity.

A monolayer or multilayer film could be further processed by thermoforming into a shaped article. For example, a sheet of the multilayer structure could be thermoformed into a casing element for a portable communication device. In thermoforming, a flat sheet is heated above its softening point and stretched to the desired shape.

An article may also be fabricated by extrusion coating or laminating some or all of the layers onto a substrate where the film is the surface layer, meaning that one side of its surface is not attached to any other object. Examples of articles include an article comprising the composition transformed into a transparent protective scratch-resistant film or sheet or outside (top) layer on a scratch-exposed object such as a transparent scratch-resistant layer on auto interior or exterior applications, for flooring tiles or sheets, for a sporting good, or as packaging film for dry abrasive goods.

The substrate can be a film or sheet comprising or derived from polyvinyl chloride, ethylene vinyl acetate copolymer, ethylene propylene diene (EPDM) elastomer, polypropylene, ethylene copolymer, cellulosic material, wood fiber, ionomer, polyamide, polyester, polyurethane, styrenic polymer, acrylonitrile-butadiene-styrene copolymer, nonwoven materials, nonpolymer materials (e.g., glass, paper, wood, stone, or metal foil), or combinations of two or more thereof.

The film or sheet may be laminated to the substrate, for example, by coextrusion, extrusion coating or any lamination techniques.

The film or sheet includes monolayer or multilayer film or sheet that may be used as, for example, a transparent, translucent and/or printed decorative or protective scratch-resistant film or sheet on an article.

Decorative films may be used as a surface treatment on many consumer articles to provide decoration and surface protection. These films have increasingly replaced other surface treatments such as coatings, paint, and lacquers due to their ease of application and durability compared to traditional coatings. They provide more economic and environmentally compatible options compared to conventional multistep coating methods. Decorative films also allow for more freedom of design and customization than traditional coatings. They may be provided with decorative elements such as by printing, embossing and the like prior to their application to a consumer article. Multilayer films may also be used, for example, as so-called "lacquer films" having shiny metallic or other effect fillers.

The multilayer structure can be adhered to a shaped article to provide a protective layer. For example, multilayer structure can be thermoformed by heat and/or pressure to adhere to a substrate to form an automotive part or a sporting good. Examples of articles that comprise the multilayer structure disclosed above can include flooring, furniture films, sporting goods such as ski top layers, hand-held devices, auto interior top layers, auto exterior scratch resistant top layers, or coverings for steps in stair cases. The new blends described herein have improved scratch resistance over previous ionomer/nylon blends, including blends wherein the ionomer comprises dicarboxylic acid moieties.

Usually the bottom layer of a floor covering can be polyvinyl chloride, ethylene vinyl acetate copolymer, ethylene methyl acrylate copolymer, ethylene butyl acrylate copolymer, or EPDM which can be highly filled (30 to 95%) with fillers such as clay, $CaCO_3$, or talc. In between the surface layer and the bottom layer, it may include a polyester or polypropylene nonwoven layer. Glass fibers can be used between the filled bottom layer and the surface layer. The surface layer can be clear and transparent such that a printable film layer can be included between the surface layer and the substrate. In many cases the print can be applied either to the surface layer (i.e., reverse printing) or to the bottom layer or to an intermediate layer (can be a polymer film) that is inserted in between the filled bottom layer and the surface layer. In that case an adhesive layer may be inserted.

In natural flooring (e.g., parquets), the bottom layer is a natural material (wood or cork) which can be treated with some kind of color such as by painting, printing or staining. It may be desirable to insert an adhesive layer between the wood and the surface layer that can adhere to this color treatment. Any known adhesive can be used.

The surface cover for the wood flooring where the substrate is wood or wood fiber or wood flour can include a maleic acid-grafted ethylene copolymer such as ethylene vinyl acetate or ethylene methyl acrylate. The thickness of surface layer can be 100-200μ and the thickness of the entire multilayer structure can be 300-600μ.

In furniture, the substrate can be MDF (compression molded wood such as that using polyvinyl chloride or polyethylene), compressed wood, or polypropylene film or sheet coated with polyurethane. A film of the polyamide mixed ion ionomer composition is adhered to the substrate to provide a protective and/or decorative layer. The thickness of such multilayer structure may be 200μ.

When used as a ski top layer, the multilayer structure can be up to 1000 mμ thick. The surface layer may, in some instances, be coextruded with the ski substrate, which can be anything from wood to ABS.

In applications for auto interior part top layers, the multilayer structure can be adhered to polypropylene or metal substrates.

As to auto exterior scratch resistant top layers, the substrate can be an ionomer that is clear or pigmented and the surface layer is clear to provide scratch- or scuff-resistance.

The multilayer structure can also be used as coverings for steps in stair cases where the surface layer can be adhered, using for example pressure sensitive adhesive, to the substrate, which is the stair case, wood, metal, rock, or stone.

The multilayer structure may also be used for other wear- and scratch-exposed objects such as seal layers in packaging structures that contain hard, abrasive objects such as dry soup mixes. Here, the surface or top layer can be heat sealed to another substrate or another film or sheet structure. Such another substrate can be metal surface, metal, metal foil, paperboard, stone, leather, or any of the substrates disclosed above.

The decorative films may be used on sporting goods such as skis, snowboards, boots, shoes, rackets and the like. Many other consumer articles such as textiles, flatware, flooring and household appliances may also incorporate decorative films. Automotive, motorcycle and other vehicle parts may be embellished with decorative films. The films may also be used as advertizing media for application to signs, buses, trucks, railroad cars. Films may also be used for large-area decoration of floors or building facades.

The composition may also be adhered to shaped substrates by injection molding, overmolding or compression molding. For example, films comprising the composition may be placed in an injection mold and the bulk polymeric material of the part injected behind the film to provide a decorated article in a single operation.

Other shaped articles, such as containers, closures, and films are useful for packaging goods such as foodstuffs, cosmetics, health and personal care products, pharmaceutical products and the like, may comprise or be produced from the polyamide mixed ion ionomer compositions.

Containers include trays, cups, cans, buckets, tubs, boxes, bowls, bottles, vials, jars, tubes, and the like. A container may be useful for packaging liquids such as water, milk, and other beverages. Alternatively, it may contain medicines, pharmaceuticals or personal care products. Other liquids that may be packaged in bottles include foods such as edible oils, syrups, sauces, and purees such as baby foods. Powders, granules and other flowable solids may also be packaged in bottles.

Injection molded hollow articles suitable as bottle preforms are also examples of molded articles. Examples of blow-molded articles include containers such as blown bottles. In the bottle and container industry, the blow molding of injection-molded preforms has gained wide acceptance. An outside layer comprising the polyamide mixed ion ionomer composition provides scratch resistance to bottles.

Injection molding a bottle preform may be conducted by transporting a molten material of the various layers into a mold and allowing the molten materials to cool. The molding provides an article that is substantially a tube with an open end and a closed end encompassing a hollow volume. The open end provides the neck of the bottle and the closed end provides the base of the bottle after subsequent blow molding.

The molding may be such that various flanges and protrusions at the open end provide strengthening ribs and/or closure means, for example screw threads for a cap. For a multilayer preform molding, the molten materials may be injected into the mold from an annular die such that they form a laminar flow of concentric layers. The molten materials are introduced into the mold such that the material for the outside polyamide mixed ion ionomer layer and the inside layer enter the mold cavity before the material for the inner layer(s) enters and form a leading edge of the laminar flow through the cavity. For a period of time, the layers enter the mold cavity in a layered concentric laminar flow. Next, flow of the material for the inner layer(s) is halted and the material for the outside and inside layers provides a trailing edge of the laminar flow. The flow continues until the entire cavity is filled and the trailing edge seals or fuses to itself to form the closed end of the preform.

To prepare a bottle, the preform may be reheated and biaxially expanded by simultaneous axial stretching and blowing in a shaped mold so that it assumes the desired shape. The neck region is not affected by the blow molding operation while the bottom and particularly the walls of the preform are stretched and thinned.

Other examples of molded articles include injection molded or compression molded caps or closures for containers. Most containers have closures or caps to adequately seal the contents of a container against leakage from or into the container. In many instances, the cap is designed for repeated removal and replacement as the consumer accesses the contents of the container. A surface layer of the polyamide mixed ion ionomer composition provides scratch resistance for such caps and closures.

Closures or caps may be prepared by injection molding or compression molding. A cap may consist of a top and a depending skirt that close around the neck of the container. Caps may comprise continuous or discontinuous threads that provide screw closures to the container and/or snap closures. They may also incorporate dispensing features, tamper-evidence features and child resistant features. Other decorative or functional features may also be present. They may also include combinations with other materials (e.g., caps having metal lid portions or portions utilizing plastic materials other than a polyamide mixed ion ionomer composition). Linerless caps may be molded from the polyamide mixed ionomer composition. Alternatively, caps may have a separate liner that is inserted into the shell of the cap. A liner may be compression molded into the shell of the cap. Other closures include plastic stoppers or "corks" that are inserted into the opening of a container such as a wine bottle or perfume bottle.

The following examples further exemplify the features of the invention and are to be construed in a non-limiting manner.

EXAMPLES

Materials Used
PA-6-1: Nylon-6 available commercially as ULTRAMID® B27 E 01 from BASF, with reported RV (1% in 96% Sulfuric Acid, measured according to ISO Test Method 307) of 2.67-2.73 and melting temperature of 220° C.
PA-6-2: Nylon-6 available commercially as ULTRAMID® B33 from BASF, with reported RV (1% in 96% Sulfuric Acid) of 3.19-3.41 and melting temperature of 220° C.
PA-6-3: Nylon-6 available commercially as ULTRAMID® B24 from BASF, with reported RV (1% in 96% Sulfuric Acid) of 2.4-2.46 and melting temperature of 220° C.

PA-12-1: Nylon-12 with high melt flow available commercially as Rilsan® AMNO from Arkema, with melting temperature of 174-180° C.
PA-12-2: Nylon-12 with lower melt flow available commercially as Rilsan® AESNO from Arkema, with melting temperature of 174-180° C.
ION-1: a zinc ionomer based on an ethylene methacrylic acid dipolymer with 15 weight % of MAA with a MI of 60 measured at 190° C. with 2.16 kg weight, neutralized to salts with Zn cations (58% neutralization), MI of 0.7 g/10 minutes measured at 190° C. with 2.16 kg weight, with 800 ppm moisture.
ION-2: a sodium ionomer based on an ethylene methacrylic acid dipolymer with 15 weight % of MAA with a MI of 60 measured at 190° C. with 2.16 kg weight, neutralized to salts with Na cations (59 neutralization), MI of 0.9 g/10 minutes measured at 190° C. with 2.16 kg weight, with 800 ppm moisture.
ION-3: a zinc ionomer based on an ethylene methacrylic acid dipolymer with 19 weight % of MAA with a MI of 60 measured at 190° C. with 2.16 kg weight, neutralized to salts with Zn cations (36% neutralization), MI of 1.3 g/10 minutes measured at 190° C. with 2.16 kg weight.
ION-4: a sodium ionomer based on an ethylene methacrylic acid dipolymer with 19 weight % of MAA with a MI of 250 measured at 190° C. with 2.16 kg weight, neutralized to salts with Na cations (45 neutralization), MI of 4.5 g/10 minutes measured at 190° C. with 2.16 kg weight.
ZnO concentrate: 30 weight % of ZnO (based on total weight of concentrate) in an ethylene/methacrylic acid dipolymer (5 weight % of MAA based on weight of dipolymer).

Zinc stearate: commercial grade.
Sodium hypophosphite: commercial grade.
Note that ION-1 and ION-2 are based on the same E/MAA base resin prior to neutralization and ION-3 and ION-4 are based on different E/MAA base resins prior to neutralization.

Melt viscosity was measured at 250° C. using a Kayeness melt rheometer of a 0.04 inch×0.8 inch 20/1 L/D orifice, with a six minute holdup/melt time in the rheometer barrel before measurements were taken. Melt viscosity (shear viscosity) was measured at shear rates from 12 second$^{-1}$ to 3003 second$^{-1}$.

Listed in Table 1 are the melt viscosities measured at 250° C. at various shear rates of representative nylon-6 and nylon-12 for selecting the polyamide component. Both PA-6-2 and PA-12-2 are extrusion grades, while PA-6-1 and PA-12-1 are molding grades with significantly lower melt viscosities. Also listed is PA-6-3, a very low melt viscosity nylon-6.

TABLE 1

| | Melt viscosity at 250° C. (Pa · sec) | | | | | | |
|---|---|---|---|---|---|---|---|
| | Shear rate (sec$^{-1}$) | | | | | | |
| Sample | 3003 | 1194 | 475 | 186 | 81 | 35 | 12 |
| PA-6-1 | 121 | 185 | 248 | 301 | 330 | 385 | 437 |
| PA-6-2 | 185 | 332 | 528 | 746 | 921 | 1100 | 1265 |
| PA-6-3 | 88 | 117 | 127 | 149 | 154 | 168 | 183 |
| PA-12-1 | 61 | 78 | 90 | 99 | 106 | 117 | 135 |
| PA-12-2 | 201 | 377 | 641 | 1011 | 1427 | 1981 | 2834 |

PA-6-1 and PA-6-2 were used in the following examples.

The data in the Table 2 illustrate the melt viscosities of Zn ionomers and mixed ion Na/Zn ionomers at various degrees of neutralization. For simulation of the viscosity of the ionomers employed in Comparative Examples and Examples, the ionomers further neutralized with ZnO concentrate listed in Table 2 were made in the same manner as preparing Comparative Examples and Examples. The data provide a reference for the melt viscosity of the ionomers employed in Comparative Examples and Examples. In the following Tables, Equivalent Ratio is the number of equivalents provided by the zinc salts divided by the number of equivalents provided by the sodium salts.

TABLE 2

| Ionomer Composition | A | B | C | D | E | F | G | H | I |
|---|---|---|---|---|---|---|---|---|---|
| Component | Parts by weight | | | | | | | | |
| ION-1 | 100 | 100 | 50 | 66.7 | | | | | |
| ION-2 | | | 50 | 33.3 | | | | | |
| ION-3 | | | | | 100 | 100 | 50 | 50 | 50 |
| ION-4 | | | | | | | 50 | 50 | 50 |
| ZnO Concentrate | 0 | 2 | 2 | 2 | 0 | 3 | 3 | 4 | 5 |
| Neutralization (%) | 58 | 66 | 67 | 67 | 36 | 46 | 50 | 53 | 57 |
| Equiv. Ratio of Zn/Na | 100% Zn | 100% Zn | 1.27 | 2.4 | 100% Zn | 100% Zn | 1.25 | 1.39 | 1.48 |
| Shear rate (sec$^{-1}$) | Capillary Rheology at 250° C. melt viscosity, (Pa · sec) | | | | | | | | |
| 3003 | 109 | 123 | 147 | 150 | 70 | 96 | 97 | 110 | 124 |
| 1194 | 170 | 192 | 240 | 241 | 104 | 147 | 149 | 171 | 195 |
| 475 | 249 | 286 | 364 | 369 | 147 | 214 | 219 | 251 | 291 |
| 186 | 357 | 422 | 541 | 548 | 198 | 298 | 298 | 354 | 423 |
| 81 | 472 | 545 | 737 | 747 | 249 | 381 | 379 | 453 | 548 |
| 35 | 597 | 700 | 974 | 973 | 195 | 461 | 459 | 553 | 682 |
| 12 | 778 | 905 | 1259 | 1283 | 353 | 593 | 540 | 695 | 840 |

In general, the melt viscosity of the ionomers increased as the degree of neutralization increased. For example, the melt viscosity of ION-1 increased after further neutralization with 2 weight % of ZnO concentrate (Samples A and B) and the melt viscosity of ION-1 increased after further neutralization with 3 weight % of ZnO concentrate (Samples E and F).

Both ION-1 and ION-2 are based on the same base resin and have about same degree of neutralization (about 60%) but with different cations. From the data, it is evident that the Na/Zn ionomer prepared from ION-2 and ION-1, both at 1:1 weight ratio and 1:2 weight ratio after further neutralization with 2 weight % of ZnO concentrate to the same neutralization level have higher melt viscosity than the Zn ionomer ION-1 neutralized to the same level (samples B, C and D).

ION-3 and ION-4 have similar degree of neutralization at around 40%, but are based on different base resins. As a result, the rheology of the mixed ion blends is more complex. The Na/Zn ionomer of ION-4 and ION-3 at 1:1 weight ratio further neutralized with 3 weight % of ZnO concentrate shows almost identical melt viscosity to that of the Zn ionomer of ION-3 further neutralized with 3 weight % of ZnO concentrate, even though it has somewhat higher neutralization (samples F and G). As neutralization increased further, the melt viscosity also increased. In summary, Zn/Na ionomers at about equivalent neutralization have higher or at least similar melt viscosity as that of a Zn ionomer.

All polyimide blend compositions were made on a 26 mm twin-screw extruder, typically with 260° C. barrel temperature settings and screw speed of 200 to 400 rpm. Polyamide, ionomer, ZnO concentrate and any other components were fed at the back end of the extruder, followed by an intense kneading section in the extruder screw to disperse these ingredients and allow sufficient contact between the basic compound and the ionomer to provide further neutralization. The melt strand from the extruder was water quenched and cut into pellets for collection and subsequent molding and evaluation.

Plaque and tensile bars of the compositions were molded on an Arburg 221K, 38 ton injection molding machine with a 1.5 oz barrel. Barrel and nozzle temperature settings were 270° C. Mold temperature was approximately 25° C. Injection pressure was adjusted based on the melt viscosity of the sample being molded. Plaque specimens of 3 inch×3 inch× 0.125 inch were molded for scratch resistance testing. Molded microtensile bars were also prepared according to the dimensions as specified in ASTM D1708, "Standard Test Method for Tensile Properties of Plastics by Use of Microtensile Specimens".

Test Methods

Melt Flow Index (MFI) was measured using ASTM D-1238 using a 2160 gram weight measured at the temperature indicated.

Hardness (Shore D) was measured using ASTM D-2240 on the injection molded plaques.

The tensile strength, modulus and elongation at break were measured according to ASTM D1708, "Standard Test Method for Tensile Properties of Plastics by use of Microtensile Specimens" using an Instron instrument with crosshead speed of 2 inches/minute. Specimens were 0.185 inch width× 0.125 inch thickness×0.875 inch length. Tensile properties measured at 125° C. were conducted in a hot box set-up. The temperature chamber is preheated for one hour to equilibrate. The sample specimens are exposed to the temperature for at least 20 minutes before mounting to the Instron jaws for testing.

Notched Izod impact was measured on 5 inch by 0.5 inch by 0.125 inch test bars according to ASTM D256.

Scratch resistance testing was measured using the method ISO 1518 on specimens of the injection molded plaques. A needle with a tip diameter of 1 mm was moved with a constant speed over the test surface of the plaque specimen while applying a load between 0 and 20 N (Newton). The value indicated is the lowest load that after being applied created a visible, permanent scratch. The accuracy of this test is +/−1 N.

The water absorption was measured by immersing specimens of 3 inch×3 inch×0.125 inch plaques in water at room temperature (20 to 25° C.) for 7 days or at 80° C. for four hours, removing the specimen from water and blotting the water from the surface of the plaque to determine weight gain.

Summarized in Tables 3, 4 and 5 are representative data demonstrating the merits of mixed ion ionomers blended with polyamides.

In Table 3, the three samples were blends of similar compositions except that Comparative Example 1 was a blend of nylon-6 and a Zn ionomer, while Example 1 and Example 2 were blends of nylon-6 and mixtures of a Na ionomer and a Zn ionomer to provide blends with mixed ions. The ionomers employed were a Na ionomer and a Zn ionomer, both based on E/MAA (81/19 weight %) with similar melt flow index. The nylon-6 was a low viscosity general-purpose grade.

TABLE 3

| Component (weight %) | Comparative Example C1 | Example 1 | Example 2 |
|---|---|---|---|
| PA-6-1 | 51 | 51 | 51 |
| ION-3 | 43 | 28.7 | 15 |
| ION-4 | 0 | 14.3 | 30 |
| ZnO Concentrate | 5 | 5 | 3 |
| Zinc Stearate | 0.8 | 0.8 | 0.8 |
| Sodium Hypophosphite | 0.2 | 0.2 | 0.2 |
| Neutralization (%) | 75 | 78 | 64 |
| Equiv. Ratio of Zn/Na | 100% Zn | 4.2 | 1.1 |
| Tensile Properties at 23° C. | | | |
| Tensile modulus (MPa) | 813 | 773 | 844.8 |
| Tensile strength (MPa) | 68.8 | 75.9 | 77.4 |
| Elongation at break (%) | 290 | 340 | 350 |
| Tensile Properties at 125° C. | | | |
| Tensile modulus (MPa) | 71.1 | 78.3 | 82.6 |
| Tensile strength (MPa) | 27.2 | 27.6 | 27.7 |
| Elongation at break (%) | 380 | 410 | 400 |
| Capillary Rheology at 250° C. | | | |
| Shear rate (sec$^{-1}$) | Shear viscosity, (Pa·sec) | | |
| 12 | 3187 | 1969 | 2080 |
| 29 | 2223 | 1475 | 1347 |
| 75 | 1577 | 1079 | 952 |
| 186 | 1108 | 766 | 677 |
| 470 | 682 | 496 | 434 |
| 1198 | 409 | 307 | 267 |
| Scratch resistance according to ISO 1518 | | | |
|  | 10 N | 8 N | 12 N |
| Izod Impact according to ASTM D256 (at −20° C.) | | | |
| KJoule/Meter$^2$ (KJ/M$^2$) | 51.7 | 57.4 | 102 |

As shown in Table 3, the tensile properties of the three samples measured at both RT and 125° C. are largely comparable (compare Comparative Example C1 and Example 1, which have similar neutralization levels). This indicated that the three samples have very similar mechanical properties. Importantly however, the melt viscosity data indicated that the two samples of nylon-6 blends containing an ionomer component with both Na and Zn have much lower melt viscosities than the nylon-6 blend containing only Zn ionomer, even at a higher neutralization level. As demonstrated above, mixed ion ionomers do not show reduced melt viscosity compared to zinc ionomers, so the reduced melt viscosity of nylons blended with mixed ion ionomers is surprising and unexpected. Also, Example 2 exhibits superior scratch resistance and much higher Izod impact resistance. These results, in which the blends of nylon and Zn/Na ionomer exhibit lower melt viscosity and better scratch resistance, are unexpected and surprising.

The samples summarized in Table 4 were blends of similar compositions of nylon-6 and ionomers. The nylon-6 employed was a medium viscosity grade. The ionomers employed were a Na ionomer and a Zn ionomer, both based on E/MAA (81/19 weight %) with about same melt flow index. The ionomers were neutralized to about the same level by the addition of zinc oxide concentrate. Comparative Example 2 was a blend of nylon-6 and a Zn ionomer, Examples 3, 4 and 5 were blends of nylon-6 and a mixture of Na ionomer and Zn ionomer and Example 6 contained nylon-6 and a Na ionomer further neutralized by the addition of zinc oxide concentrate.

lower melt viscosities and excellent scratch resistance, which cannot be attained by either Na ionomer or Zn ionomer alone. During preparation of Example 6, the blend containing ionomer with the largest percentage of Na ions, high melt swell was encountered. Also as indicated in water absorption testing, this blend absorbed the highest amount of water. Thus, it may be desirable to limit the amount of sodium ions in the mixed ionomer to the lowest amount necessary to achieve the

TABLE 4

| Component (weight %) | Comparative Example C2 | Example 3 | Example 4 | Example 5 | Example 6 |
|---|---|---|---|---|---|
| PA-6-2 | 59.1 | 59.1 | 59.1 | 59.1 | 59.1 |
| ION-3 | 37 | 28.5 | 18.5 | 8.5 | 0 |
| ION-4 | 0 | 8.5 | 18.5 | 28.5 | 37 |
| ZnO Concentrate | 3 | 3 | 3 | 3 | 3 |
| Zinc Stearate | 0.75 | 0.75 | 0.75 | 0.75 | 0.75 |
| Sodium Hypophosphite | 0.15 | 0.15 | 0.15 | 0.15 | 0.15 |
| Equiv. Ratio of Zn/Na | 100% Zn | 5.3 | 2.0 | 1.0 | 0.6 |
| Neutralization Level (%) | 63 | 65 | 67 | 70 | 72 |
| Tensile Properties at 23° C. | | | | | |
| Tensile modulus (MPa) | 803 | 834 | 827 | 781.1 | 714.7 |
| Tensile strength (MPa) | 63.3 | 63.2 | 88.2 | 76.7 | 87.6 |
| Elongation at break (%) | 230 | 250 | 335 | 350 | 350 |
| Tensile Properties at 125° C. | | | | | |
| Tensile modulus (MPa) | 88.4 | 87.5 | 80 | 83.2 | 93.5 |
| Tensile strength (MPa) | 28.2 | 25 | 29 | 25.5 | 27.1 |
| Elongation at break (%) | 290 | 230 | 315 | 300 | 320 |
| Capillary Rheology at 250° C. | | | | | |
| Shear rate (sec$^{-1}$) | Shear viscosity, (Pa·sec) | | | | |
| 12 | 6309 | 5053 | 3530 | 3369 | 2892 |
| 29 | 3531 | 2771 | 2119 | 1952 | 1720 |
| 75 | 2281 | 1767 | 1399 | 1339 | 1218 |
| 186 | 1473 | 1163 | 963 | 931 | 858 |
| 470 | 884 | 695 | 590 | 574 | 534 |
| 1198 | 510 | 410 | 355 | 346 | 331 |
| Water absorption (weight %) | | | | | |
|  | 1.6 | 1.5 | 1.7 | 2.4 | 3.7 |
| Scratch resistance according to ISO 1518 | | | | | |
|  | 10 N | 10 N | 12 N | 10 N | 9 N |
| Izod Impact according to ASTM D256 (at −20° C.) | | | | | |
| KJoule/Meter$^2$ [KJ/M$^2$] | 108 | 67.4 | 91.2 | 30.6 | 27.3 |

As seen from melt viscosity data, Comparative Example 2, the blend comprising only Zn ionomer, exhibited a very high melt viscosity. As portions of the Zn ionomer were replaced by Na ionomer, the melt viscosity gradually reduced. The samples all exhibited excellent mechanical properties as measured at 23° C. and at 125° C., and scratch resistance as well. Example 4 stands out with a scratch resistance as high as 12 N. There is a clear demonstration that a blend of nylon-6 with a mixed ion ionomer component surprisingly attained both desired melt viscosity reduction. Preferably, the equivalent ratio of Zn to Na is 0.7 to 6.0, more preferably 1 to 6.

In Table 5, the five samples are blends of similar compositions except that Comparative Example C4 is a blend of nylon-6 and a Zn ionomer, while the rest are blends of nylon-6 and a mixture of Na monomer and Zn monomer. The nylon-6 employed was a medium viscosity grade. Ionomers employed were a Na ionomer and a Zn monomer, both based on E/MAA (85/15 weight %) with about similar melt flow index.

TABLE 5

| Component (weight %) | Comparative Example C4 | Example 7 | Example 8 | Example 9 | Example 10 |
|---|---|---|---|---|---|
| PA-6-2 | 59.25 | 59.1 | 54.1 | 59.15 | 54.25 |
| ION-1 | 37.85 | 19 | 21.5 | 9 | 21.5 |
| ION-2 | 0 | 19 | 21.5 | 29 | 21.5 |
| ZnO Concentrate | 2 | 2 | 2 | 2 | 2 |
| Zinc Stearate | 0.75 | 0.75 | 0.75 | 0.75 | 0.75 |
| Sodium Hypophosphite | 0.15 | 0.15 | 0.15 | 0.1 | 0 |
| Equiv. Ratio of Zn/Na | 100% Zn | 1.74 | 1.65 | 0.75 | 1.65 |
| Neutralization Level | 80 | 81 | 78 | 81 | 78 |

TABLE 5-continued

| Component (weight %) | Comparative Example C4 | Example 7 | Example 8 | Example 9 | Example 10 |
|---|---|---|---|---|---|
| Tensile Properties at 23° C. | | | | | |
| Tensile modulus (MPa) | 725 | 748 | 678 | NA | NA |
| Tensile strength (MPa) | 87.8 | 78.8 | 80.3 | NA | NA |
| Elongation at break (%) | 325 | 340 | 350 | NA | NA |
| Tensile Properties at 125° C. | | | | | |
| Tensile modulus (MPa) | 108 | 104.2 | 96.2 | 102 | 88.7 |
| Tensile strength (MPa) | 37.3 | 33.2 | 29.4 | 34.1 | 28.3 |
| Elongation at break (%) | 360 | 365 | 360 | 390 | 360 |
| Capillary Rheology at 250° C. | | | | | |
| Shear rate (sec$^{-1}$) | Shear viscosity, (Pa·sec) | | | | |
| 12 | 6309 | 5053 | 3530 | 3369 | 2892 |
| 29 | 3531 | 2771 | 2119 | 1952 | 1720 |
| 75 | 2281 | 1767 | 1399 | 1339 | 1218 |
| 186 | 1473 | 1163 | 963 | 931 | 858 |
| 470 | 884 | 695 | 590 | 574 | 534 |
| 1198 | 510 | 410 | 355 | 346 | 331 |
| Scratch resistance according to ISO 1518 | | | | | |
| | 10 N | 10 N | 14 N | 16 N | 18 N |

As seen from capillary rheology data, Comparative Example C4, the blend with only Zn ionomer, exhibited very high melt viscosity. Surprisingly the blends containing both Na and Zn ionomers, on the other hand, all had much lower viscosity, even at nearly identical neutralization levels. The examples all exhibited excellent tensile properties as measured at both 23° C. and at 125° C. and excellent scratch resistance. Examples 9 and 10 stand out with scratch resistance as high as 16 N to 18N. There is a clear demonstration that a blend of nylon-6 with a mixture of Na ionomer and Zn ionomer attained both lower melt viscosities for processing advantage and excellent scratch resistance. Example 8 shows the effect of adding sodium hypophosphite compared to Example 10.

What is claimed is:

1. A shaped article comprising a polyamide/ionomer blend composition comprising
   (1) a polyamide having a melt viscosity from 400 Pa·sec to 4000 Pa·sec, measured at 250° C. and a shear rate of 12 sec$^{-1}$, in an amount in the range of about 35 to about 70 weight % of the combination of (1) and (2); and
   (2) an ionomer composition in an amount in the range of about 30 to about 65 weight % of the combination of (1) and (2), wherein the ionomer composition comprises at least one neutralized acid copolymer, wherein the acid copolymer comprises copolymerized units of ethylene with
   (a) copolymerized units of an alpha-beta unsaturated monocarboxylic acid wherein the monocarboxylic acid is methacrylic acid or acrylic acid or a combination thereof;
   (b) optionally copolymerized units of an alpha-beta unsaturated dicarboxylic acid derivative selected from maleic anhydride and alkyl monoesters of maleic acid or fumaric acid, in the amount of 0 to about 7 weight % of the copolymer; wherein the combination of (a) and (b) is from about 7 to about 21 weight % of the copolymer;
   (c) optionally copolymerized units of an alkyl acrylate or alkyl methacrylate comonomer, in the amount of 0 to about 25 weight % of the copolymer; and
   wherein 60 mol % to about 95 mole % of the total carboxylic acid groups in the copolymer are neutralized to salts comprising cations of zinc (Zn) and cations of sodium, wherein Zn cations comprise about 10 to about 90% mole equivalents and sodium cations comprise about 90 to 10% mole equivalents.

2. The article according to claim 1 wherein the polyamide has a melt viscosity from 400 Pa·sec to about 3000 Pa·sec, measured at 250° C. and a shear rate of 12 sec$^{-1}$.

3. The article according to claim 1 wherein Zn cations comprise about 30 to about 70% mole equivalents.

4. The article according to claim 3 wherein the polyamide is nylon-6, nylon-66, nylon-610, nylon-612, nylon-1010, nylon-11, nylon-12, or a combination thereof.

5. The article according to claim 1 wherein the polyamide is nylon-6, nylon-66, nylon-610, nylon-612, nylon-6/66, nylon-6/610, nylon-6/66/610, nylon-6/6t, nylon-1010, nylon-11, nylon-12, or a combination thereof.

6. The article according to claim 5 wherein the polyamide is nylon-6 with relative viscosity from 2.7 to 4.0, as measured using 1% of polymer in 96% sulfuric acid according to ISO Test Method 307.

7. The article according to claim 1 wherein the polyamide has a melting point in the range of 170 to 290 C.°, as measured according to differential scanning calorimetry by ASTM D789.

8. The article according to claim 7 wherein the polyamide has a melting point in the range of 170 to about 230° C., and comprises an aliphatic or semiaromatic polyamide.

9. The article according to claim 7 wherein the polyamide comprises an aliphatic polyamide.

10. The article according to claim 1 wherein the shape of the article is nonplanar and comprises a surface or outside layer comprising the polyamide/ionomer blend composition.

11. The article according to claim 10 wherein the article consists essentially of the blend composition.

12. The article according to claim 10 wherein the article is multilayer, comprising a surface layer consisting essentially of the blend composition and at least one additional layer comprising a composition other than the blend composition.

13. The article according to claim 10 wherein the article is a container, molded automotive part, bottle, jar, tub, tank, tray, cup, rod stock, casing element for a portable communication device, can, bucket, box, bowl, vial, tube, bottle preform, or cap.

14. The article according to claim 1 having greater scratch resistance measured according to ISO 1518 than a comparison article comprising a comparison blend of the polyamide and an ionomer comprising cations of zinc that does not contain cations of sodium.

15. The article according to claim 1 wherein the polyamide comprises nylon-6 with relative viscosity from 3.1 to 4.0, as measured using 1% of polymer in 96% sulfuric acid according to ISO Test Method 307, and wherein the ionomer composition comprises at least one neutralized acid copolymer, wherein the acid copolymer comprises copolymerized units of ethylene with copolymerized units of an alpha-beta unsaturated monocarboxylic acid wherein the monocarboxylic acid is methacrylic acid or acrylic acid or a combination thereof; and wherein 75 mol % to about 85 mole % of the total carboxylic acid groups in the copolymer are neutralized to salts comprising cations of zinc (Zn) and cations of sodium, wherein the equivalent ratio of zinc to sodium is from 0.7 to 1.7.

* * * * *